United States Patent
Murakami

(10) Patent No.: US 6,886,083 B2
(45) Date of Patent: Apr. 26, 2005

(54) APPARATUS AND METHOD FOR CONTROLLING A CARD DEVICE

(75) Inventor: Masatoshi Murakami, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 180 days.

(21) Appl. No.: 10/233,464

(22) Filed: Sep. 4, 2002

(65) Prior Publication Data

US 2003/0079096 A1 Apr. 24, 2003

(30) Foreign Application Priority Data

Oct. 22, 2001 (JP) ........................................ 2001-323956

(51) Int. Cl.$^7$ .............................................. G06F 13/00
(52) U.S. Cl. ...................... 711/156; 711/154; 711/115; 711/103; 235/380
(58) Field of Search ................................ 711/156, 154, 711/115, 103, 163, 152; 235/380; 712/228, 229

(56) References Cited

U.S. PATENT DOCUMENTS

| | | | |
|---|---|---|---|
| 5,168,151 A | * 12/1992 | Nara | ............................ 235/492 |
| 5,541,985 A | * 7/1996 | Ishii et al. | .................... 379/111 |
| 5,581,708 A | 12/1996 | Iijima | |
| 5,799,168 A | 8/1998 | Ban | |
| 6,085,282 A | 7/2000 | Hansen et al. | |
| 6,226,749 B1 | 5/2001 | Carloganu et al. | |
| 6,633,928 B2 | * 10/2003 | Aulino et al. | ................... 710/52 |

FOREIGN PATENT DOCUMENTS

| | | | |
|---|---|---|---|
| EP | 0 402 758 | 12/1990 | |
| WO | WO 9636051 A1 | * 11/1996 | ............ G11C/7/00 |
| WO | WO 01/08087 | 2/2001 | |

OTHER PUBLICATIONS

SD Group; "Physical Layer Specification"; Part 1, Version 1.01, SD Memory Card Specifications, pp. 1–32, (Apr. 2001).

* cited by examiner

Primary Examiner—Hong Kim
(74) Attorney, Agent, or Firm—Finnegan, Henderson, Farabow, Garrett & Dunner, L.L.P.

(57) ABSTRACT

An apparatus controls a card device. The apparatus includes an interface unit and a control unit. The interface unit receives a command issued by a host system. The received command contains an operation command designating an operation to be performed by the card device and execution state information showing a state in which the card device performs the operation designated by the operation command. The control unit performs a process of changing the state of the card device to a state designated by the execution state information contained in the received command, a process of issuing to the card device the operation command contained in the received command, and a process of setting the card device back to a specific state.

15 Claims, 8 Drawing Sheets

| Command issued from the OS | OS_read |
|---|---|
| Command issued from the SD application | SD_standby, SD_information, SD_transfer |
| Command received at the SD card | SD_standby, SD_read( failed ), SD_information, SD_transfer |

| Byte | 7 bit | 6 bit | 5 : 0 bit |
|---|---|---|---|
| 0 | Operation Code | | |
| 1 | Standby flag | ACMD flag | 0 |
| 2 | Command Index to the memory card | | |
| 3 | Command Argument to the memory card | | |
| 4 | Data transfer length | | |

APPARATUS AND METHOD FOR CONTROLLING A CARD DEVICE

CROSS-REFERENCE TO RELATED APPLICATIONS

This application is based upon and claims the benefit of priority from the prior Japanese Patent Application No. 2001-323956, filed Oct. 22, 2001, the entire contents of which are incorporated herein by reference.

BACKGROUND OF THE INVENTION

1. Field of the Invention

The present invention relates to an apparatus and method for controlling a card device in accordance with an access command supplied from a host system.

2. Description of the Related Art

In recent years, various portable electronic apparatuses, such as personal computers, PDA(Personal Data Assistants) s, cameras, and cellular telephones, have been developed. In these portable electronic apparatuses, memory cards, i.e., removable storage devices of one type, are used in greater numbers. Know as memory cards are: PCMCIA cards (PC cards) and SD (Secure Digital) cards. SD cards are smaller than the PCMCIA cards.

Each SD card is a memory card device that incorporates a flash memory. It is designed to meet demands for security, large storage capacity, and high-speed operation. The SD card has a security function for protecting the copyright of contents, such as music data. The music data stored in SD card is protected from illegal copying or any other illegal conducts.

Generally, memory cards with a security function have a controller, a user data area, and a secure area. The user data area is a storage area that the user can freely access. The secure area is a storage area that is protected by the security function.

A memory card is connected to a personal computer through a memory card controller. The memory card controller receives an access command supplied from the operating system provided in the personal computer and converts the command into one or more operation commands for controlling the memory card. The memory card controller supplies the operation command or commands to the memory card. The user data area in a memory card may be seen from the operating system, as a storage device similar to a disk drive. By contrast, the secure area cannot be seen at all. The secure area can be accessed by a special application program and a special reproduction apparatus, each comprising a security mechanism.

The special application program and reproduction apparatus generate security access commands for accessing the secure area to memory card controller. The memory card controller converts each of the security access command to one or more operation commands, which are supplied to the memory card.

If the operation commands for the memory card, which are concerned with the security function, are extended or if the security access commands are changed as the application program interface (API) changes, however, it is necessary to redesign the memory card controller to accord with the extension of the operation codes or the changes in the security access commands.

There is another problem with the memory card controller. Generally, various states are defined for the memory card. The operation commands that the memory card can accept differ, from a state to a state. Therefore, the memory card controller needs to determine which state the memory card assumes at present. That is, before generating an operation command, the memory card controller must set the memory card into the very state in which the memory card can accept that operation command.

BRIEF SUMMARY OF THE INVENTION

An object of the present invention is to provide an apparatus and method which can respond to the extension of operation commands of a card device and to the change of an application program interface, and the like, and which control the card device without a complicated control of the state of the card device.

According to an embodiment of the present invention, there is provided an apparatus for controlling a card device in accordance with an access command supplied from a host system.

The apparatus comprises an interface unit and a control unit. The interface unit is configured to receive a command issued by the host system to access the card device. The received command contains an operation command designating an operation to be performed by the card device and execution state information showing a state in which the card device performs the operation designated by the operation command. The control unit is configured to perform a process of changing the state of the card device to a state designated by the execution state information contained in the received command, a process of issuing to the memory card the operation command contained in the received command, and a process of setting the card device back to a specific state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and together with the general description given above and the detailed description of the embodiments given below, serve to explain the principles of the invention.

DETAILED DESCRIPTION OF THE INVENTION

Hereafter, an embodiment of this invention will be described, with reference to the accompanying drawing.

Figure 1:
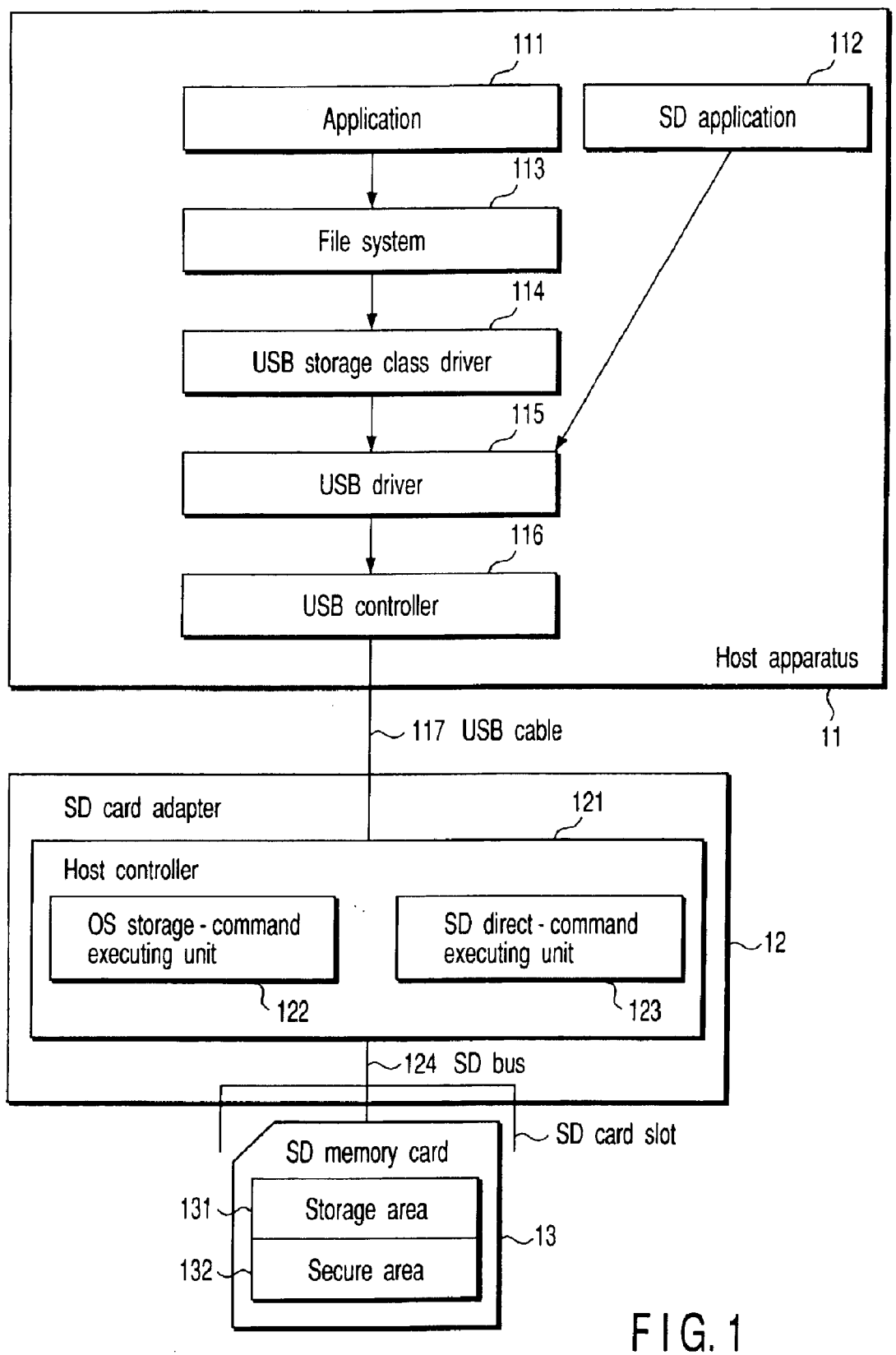
FIG. 1 is a block diagram showing a data-processing system that uses a memory card controller according to one embodiment of this invention.

FIG. 1 shows a data-processing system using a memory card controller according to one embodiment of this invention.

This data-processing system comprises a host apparatus 11 and an SD card adapter 12. The SD card adapter 12 is designed to connect an SD memory card device 13 to the host apparatus 11. The host apparatus 11 is a data-processing apparatus, such as a personal computer. In the present embodiment, the SD card adapter 12 is a USB (Universal Serial Bus) device and is connected by a USB cable to the USB controller 116 incorporated in the host apparatus 11.

The memory card 13 can be removably inserted into the SD card adapter 12. The SD card adapter 12 is a device that controls SD memory card 13. The SD memory card 13 is a card device that has a security function of protecting the copyrights of the contents. The card device 13 has a storage area 131 (also known as "user data area") and a secure area 132. The user of the SD memory card 13 can freely read and write data from and in the storage area 131. The data stored in the secure area 132 is protected by the security function.

Various states are defined in the SD memory card 13. The states can be changed in accordance with the operation commands supplied from the SD card adapter 12 and the progress of operation performed in the SD memory card 13. The operation commands that the SD memory card 13 can receive and execute correspond to the states, respectively. To make the SD memory card 13 perform the operation associated with, a operation command, it is necessary to set the SD memory card 13 into the state in which the card 13 can accept that operation command.

In the host apparatus 11, an ordinary application program 111 and an application program (SD application program) 112, both shown in FIG. 1, are executed. The application program 111 is, for example, filer software for processing data files. The application program 112 has a copyright-protecting function.

The application program 111 can read and write data files from and in a storage area 131 by means of the file system 113 that is a part of the operating system (OS) performed in the host apparatus 11.

More precisely, the USB storage-class driver 114 of the operating system (OS) generates an access command and supplies it to SD card adapter 12 via a USB driver 115 and a USB controller 116, in accordance with a file access request supplied from the application program 111 to the file system 113. The file system 113 of the OS can therefore use the storage area 131 of the SD memory card 13 as a storage device in the same way as it uses disk drives.

The access command is an intelligent disk-accessing command based on the ATA command. The SD card adapter 12 converts this access command to one or more operation commands for the SD memory card 13. The operation command or commands thus obtained are sent to the SD memory card 13. Hereafter, any access command sent to the SD card adapter 12 from the USB storage-class driver 114 of the OS to access the storage area 131 shall be referred to as "storage command."

The SD application program 112 has a security mechanism that corresponds to the security function of the SD memory card 13. Hence, not only the storage area 131 of the SD memory card 13, but also the secure area 132 can be accessed. To access the secure area 132, the SD application program 112 gives an access command to SD card adapter 12 through the USB driver 115 and the USB controller 116.

This access command is a direct command (passthrough command) that can be sent, without being processed, to the SD memory card 13. The direct command contains an operation command for the SD memory card 13, which can directly designate an operation that the SD memory card 13 should perform.

The direct command contains the execution state information, which is a parameter of the direct command. The execution state information represents the state in which the SD memory card 13 should execute the operation that corresponds to the operation command contained in the direct command. The access command given to the SD card adapter 12 from the SD application program 112 to access the secure area 132 shall be hereinafter referred to as "SD direct command with execution state."

The direct command further contains an extended-command flag data, which is a parameter of the direct command. The extended command flag data indicates whether the operation command contained in the direct command is an extended command that needs to issue a modification command. The modification command indicates that a next operation command is the extended command.

The extended command is a command expressed as a combination of a modification command and an operation command. The operation command will be issued after the modification command if the operation command contained in the direct command is an extended command.

The SD card adapter 12 controls the SD memory card 13 inserted into it through the SD card slot, in accordance with the access command supplied from the host system that uses SD memory card 13. The host apparatus 11 to which the SD card adapter 13 is connected, or more specifically the OS and the SD application program 112, both executed in the host apparatus 11, function as the host system.

The SD card adapter 12 incorporates a host controller 121. The host controller 121 is designed to operate as the interface between the host apparatus 11 and the SD memory card 13. The host controller 121 performs communication between the host apparatus 11 and the SD memory card 13 through an SD bus 124. The host controller 121 is a microcomputer. The host controller 121 generates operation commands, which control all communication between the SD memory card 13 and the host controller 121.

The host controller 121 has an OS-storage command-executing unit 122 and an SD direct command-execution unit 123. The OS-storage command-executing unit 122 interprets and executes an storage command, generating one or more operation commands required to make the card 13 perform the operation corresponding to the storage command. The unit 122 controls the SD memory card 13 by using these operation commands.

The OS-storage command-executing unit 122 performs a process to set the SD memory card 13 back into the prescribed state after it executes the storage command. The unit 122 sets the card 13 back into the prescribed state, in order to maintain the SD memory card 13 in a specific regular state after the card 13 has performed the operation (command processing) that corresponds to the storage command.

The SD direct command-execution unit 123 executes the above-mentioned SD direct command (SD direct command with execution state). More correctly, the SD direct command-execution unit 123 carries out the following sequence of processes:

(1) Transit the SD memory card 13 to the state specified by execution state information contained in the SD direct command.

(2) Issue the operation command contained in the SD direct command to the SD memory card 13, thereby to make the SD memory card 13 performs the operation corresponding to the operation command.

(3) Transit the SD memory card 13 to the above-mentioned specific state, in order to set the SD memory card 13 back to the regular state.

Thus, the state of SD memory card 13 will return to the regular state that is assumed before change of state, even if the direct command with execution state is executed and the state of the SD memory card 13 is thereby changed.

In practice, before performing the process (2) of issuing the operation command, the following process is carried out:

(2A) Issue the modification command to the SD memory card 13 if the extended command flag data indicates that the operation command contained in the SD direct command is an extended command.

Hence, the processes (1), (2A), (2) and (3) are performed in the order they are mentioned. If the state specified by the execution state information is a regular state, the processes (1) and (3) will not be carried out, and only the processes (2A) and (2) are performed.

Thus, the SD card adapter 12 performs different processes in accordance with whether the access command supplied from the host apparatus 11 is a storage command or a direct command with an execution state.

An example of the composition of SD memory card 13 will be described, with reference to FIG. 2.

Figures 2, 3:
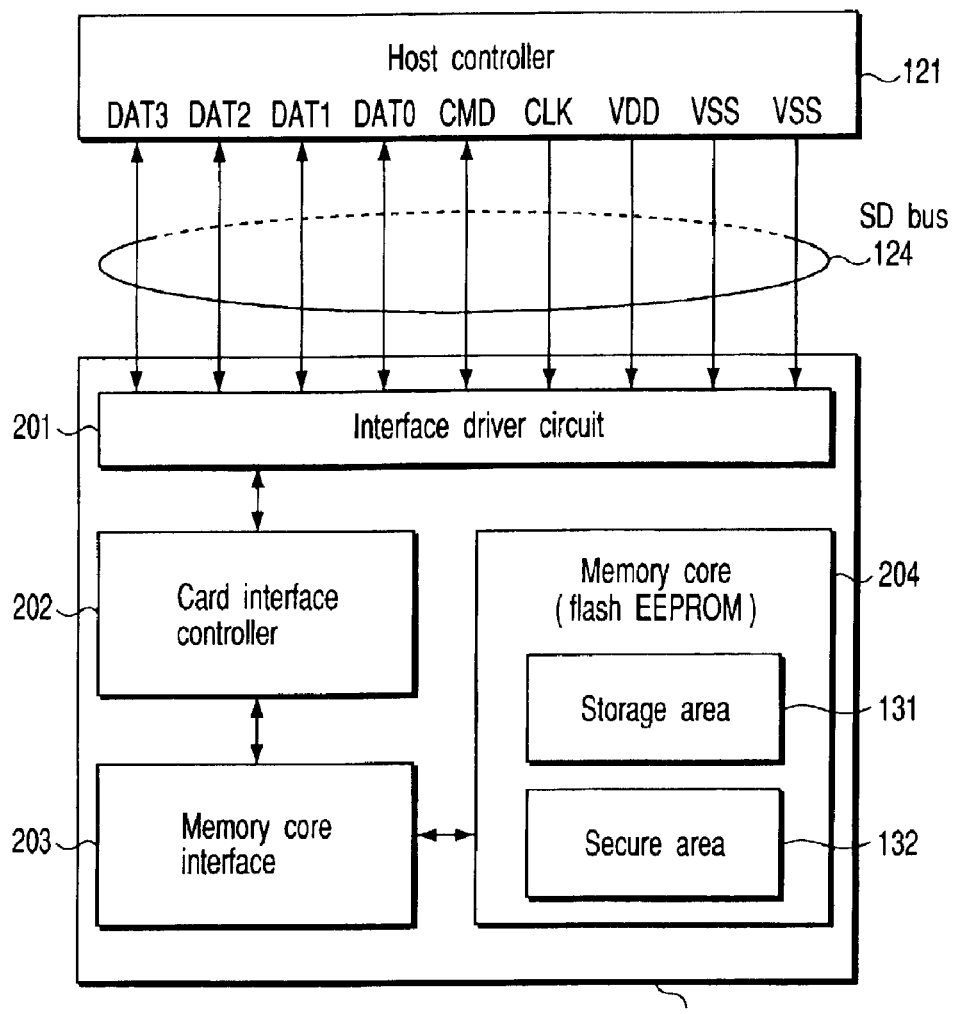
FIG. 2 is a block diagram illustrating a memory card that is controlled by the system of FIG. 1.
FIG. 3 is a table showing a relation between two representative states that the memory card controlled by the system of FIG. 1 may assume, on the one hand, and the operation commands that the memory card can receive in the two states, on the other hand.

As FIG. 2 shows, the SD memory card 13 incorporates an interface driver circuit 201, a card interface controller 202, a memory core interface 203, and a memory core 204. The memory core 204 is, for example, a nonvolatile memory such as a flash EEPROM. In the storage space of this nonvolatile memory, the storage area 131 and the secure 132 are provided.

The card interface controller 202 is an internal core circuit that performs an operation in accordance with the operation command it has received from the host controller 121 through the interface driver circuit 201. The controller 202 incorporates registers for holding various status data items concerning the secure area 132.

The various status data items about the secure area 132, as well as the secure area 132, are protected by the security function of the card interface controller 202. In view of this, the registers used for storing the various status data items about the secure area 132 are also a part of the secure area 132. It follows that a read access is made to the various status data items about the secure area 132 by utilizing the direct command with execution state.

The memory core interface 203 writes data into the memory core 204 and reads data from the memory core 204, under control of the card interface controller 202.

Six communication lines (data DAT 0-3, command CMD, clock CLK) and three power supply lines (VDD, VSS, VSS) are defined for the SD bus 124. The six communication lines (data DAT 0-3, command CMD, clock CLK) have the following functions:

DAT 0-3: Each data line is a bi-directional signal line for use in transferring data between the host controller 121 and the SD memory card 13.

CMD: An operation command (it may only be called a command) is transferred from the host controller 121 to the SD memory card 13, and a response is made from the SD memory card 13 to the host controller 121.

CLK: A clock signal line is a line for transmitting a clock signal CLK to the SD memory card 13 from the host controller 121. The transfer of the operation command from the host controller 121 to the SD memory card 13, the data transfer between the host controller 121 and the SD memory card 13, and the like are effected in synchronism with the clock signal CLK.

FIG. 3 shows two typical states that the SD memory card 13 may assume and also a relation between these states, on the one hand, and the operation commands that the card 13 may receive and execute in the respective states.

The following states are defined for the SD memory card 13:

Stand-by state
Transfer state
Sending-data state
Receive-data state
Programming state
Disconnect state Of these states, the standby state is a save-power state in which the card 13 consumes a little power. The operation commands that the card 13 can receive and execute in the standby state are, for example, an "SD_information" command and an "SD_transfer" command. The operation command about access of the memory core 204 cannot be received or executed by the SD memory card 13. The "SD_information" command is an operation command that requests for the acquisition of various status data items about the secure area 132 and similar data items. The "SD_transfer" command is an operation command that requests for the state transition of the card 13 to the transfer state.

The transfer state is a state that enables the SD memory card 13 to receive and execute the operation command about an access to the memory core 204 from the host controller 121. While the SD memory card 13 remains in the transfer state, it can receive and execute, for example, an "SD_read" command, an "SD_write" command, an "SD_standby" command, and the like.

The "SD_read" command is an operation command that requests for reading of data from the storage area 131 of the memory core 204. The "SD_write" command is an operation command that requests for writing of data into the storage area 131 of the memory core 204. When the SD memory card 13 receives the "SD_read" command, while remaining in the transfer state, the SD memory card 13 goes into the sending-data state. The sending-data state is a state in which the card 13 reads data from the memory core 204 and transmits the data to the host controller 121. When the operation initiated by the "SD_read" command is completed, the SD memory card 13 returns to the transfer state.

Upon receipt of the "SD_write" command in the transfer state, the SD memory card 13 goes into the receive-data state. The receive-data state is a state in which the card 13 receives the write-in data from the host controller 121 and accumulates the data in the buffer memory provided in the card interface controller 202. Upon receiving all write-in data, the SD memory card 13 transits itself from the receive-data state to the programming state. The programming state is a state in which the card 13 writes the write-in data accumulated in the buffer memory, into the memory core 204. When the SD memory card 13 finishes writing the data into the memory core 204, it returns to the transfer state.

The "SD_standby" command is an operation command that requests for a change in the state of the SD memory card 13, to the standby state. Note that the "SD_standby" command and the "SD_transfer" command are actually the same operation command (CMD7). If the SD memory card 13 receives an operation command (CMD7) in the standby state, it will transit itself to the transfer state. If the card 13 receives an operation command (CMD7) in the transfer state, it will transit itself to the standby state.

Further, while remaining in the transfer state, the card 13 can receive and execute an "SD_secure_read" command, an "SD_secure_write" command, and "SDA_SecureSize" command. The "SD_secure read" command requests for reading of data from the secure area 132 of the memory core 204. The "SD_secure_write" command requests for data writing into the secure area 132 of the memory core 204. The "SDA_SecureSize" command is an extended command (ACMD) that requests for the storage size of the secure area 132.

The transition of the state of the SD memory card 13, which takes place when the card 13 receives the "SD_secure_read" command or the "SD_secure_write" command is the same as the transition of state that occurs when the card 13 receives the "SD_read" command or the "SD_write" command, either specified earlier. Since the "SDA_SecureSize" command is an extended command, it is necessary to generate a modification command (SD_ACMD) before the "SDA_SecurSize" command is issued.

In the present embodiment, the transfer state is used as the above-mentioned regular state. The SD memory card 13 always stays in the transfer state, unless it should assume the standby state. Thus, an operation command about the access of the memory core 204 can be immediately given to the SD memory card 13. To use the transfer state as the regular one, a standby flag data (Stand-by flag) can be used as the execution state information of the SD direct command with execution state. The standby flag data is an execution-state change flag data that shows whether it is necessary to transit the SD memory card 13 to the standby state.

Next, how the arbitration between the access command (storage command) generated by the OS and the access command (direct command with execution state) generated by the SD application program 112 will be explained.

To clarify the reason whey the direct command with execution state is used, consider the case where the execution state does not accompany the direct command generated by the SD application program 112.

Figures 4, 5:
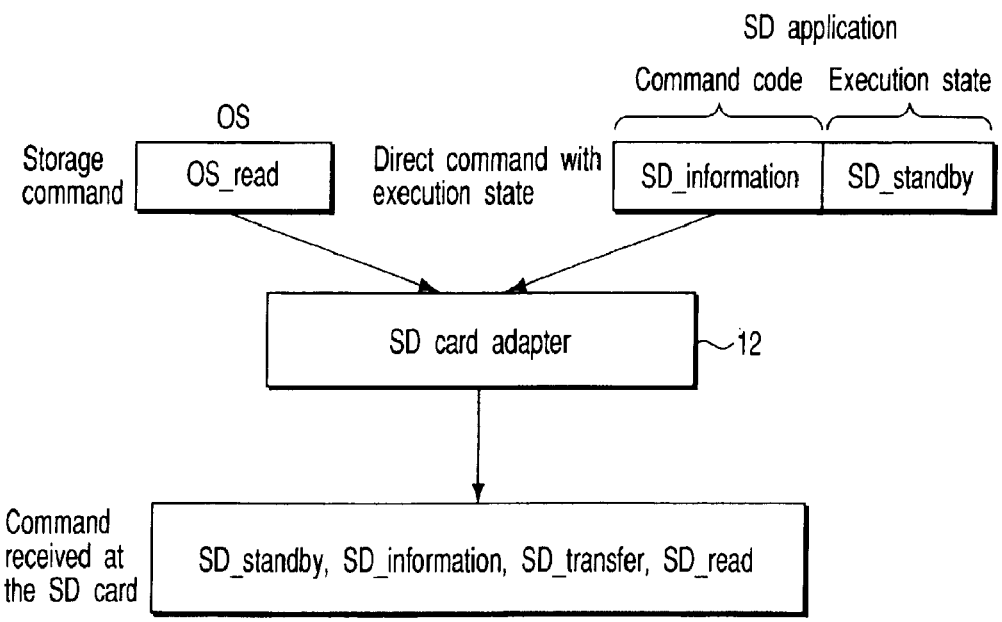
FIG. 4 is a table explaining the fault produced when no direct commands, each with an execution state, are used in the system of FIG. 1.
FIG. 5 is a diagram illustrating the mediation processing between the access commands executed by the system of FIG. 1.

The SD application program 112 issues the direct command by using the operation command that the SD memory card 13 can directly interpret as an access command. Therefore, to acquire the various status data items about the secured area 132, the SD application program 112 generates three direct commands, i.e., "SD_standby" command, "SD_information" command and "SD_transfer" command, one after another, as is illustrated in FIG. 4. Each of direct commands is issued as an access command to the SD card adapter 12.

In the host apparatus 11, all programs are executed in parallel in multitask scheme. Since the operating system and the SD application program 112 are executed in parallel, the OS may issue a storage command as an access command, for example, after the SD application program 112 generates an "SD_standby" command and before the program 112 generates an "SD_information" command. If the storage command is an read demand command (OS_read) that requests for the data-reading from the storage area 131, the SD card adapter 12 converts the read demand command (OS_read) to the "SD_read" command, and supplies the "SD_read" command to the SD memory card 13.

Therefore, the SD memory card 13 receives the "SD_standby" command, the "SD_read" command, the "SD_information" command and the "SD_transfer" command, the order these commands are mentioned.

Since the "SD_read" command is an operation command that can be received in the transfer state only, the SD memory card 13 cannot be made to perform operation designated by the "SD_read" command. Nor can it be guaranteed that the SD memory card 13 performs the operations designated by the "SD_information" command and "SD_transfer" command that are issued after the "SD_read" command.

In the present embodiment, the faults described above do not occur because the direct command with execution state is used. The reason why will be described.

As FIG. 5 shows, the SD application program 112 generates a direct command with execution state, which contains the "SD_information" command and execution state information (Stand-by flag="1") that indicates the state in which the command should be executed. The direct command is issued as an access command to the SD card adapter 12.

Upon receipt of the direct command with execution state from the SD application program 112, the SD card adapter 12 executes the direct command and generates three operation commands, i.e., "SD_standby" command, "SD_information" command, and "SD_transfer" command, one after another one. The SD card adapter 12 executes the access commands supplied from OS or the SD application program 112, one by one, in the order it receives these access commands. Hence, whenever the OS issues an access command, for example, the read demand command (OS_read), to the SD card adapter 12, such fault was explained with reference to FIG. 4 will not occur.

Figures 6, 7:
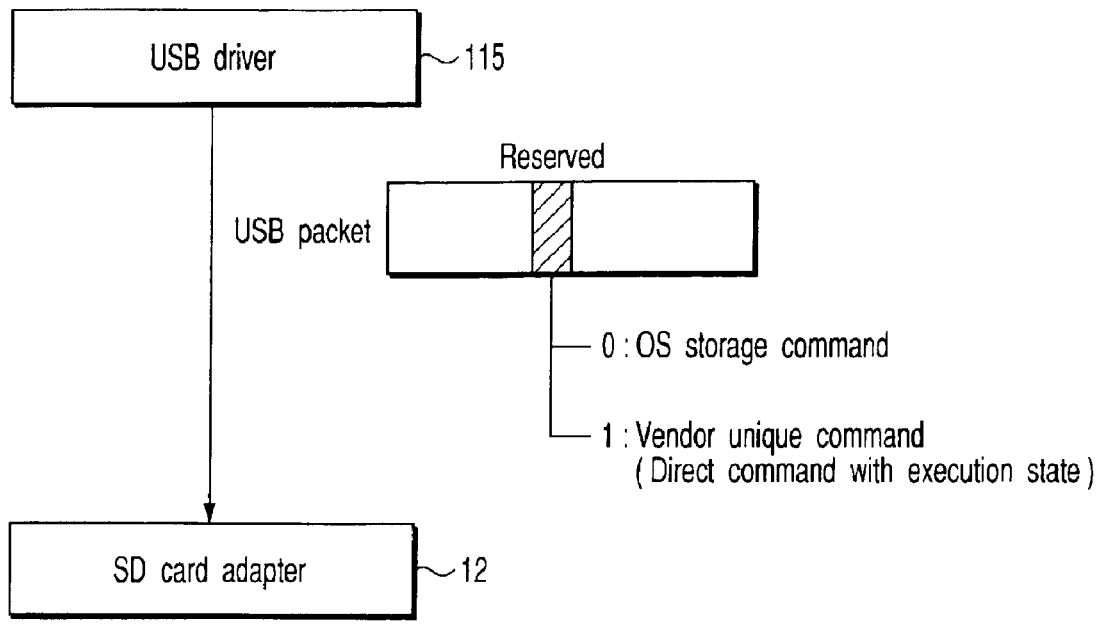
FIG. 6 is a diagram showing an example of a USB packet used as an access command in the system of FIG. 1.
FIG. 7 is a table showing an example of a direct command with an execution state, used by the system of FIG. 1.

With reference to FIG. 6, it will be explained how the SD card adapter 12 determines whether the received access command is an storage command or a direct command with execution state.

As pointed out earlier, the SD card adapter 12 is realized as a USB device. Therefore, the access command is supplied from OS or the SD application program 112 to SD card adapter 12 in the form of a USB packet. The USB packet has a reservation field that is not usually used.

The SD application program 112 demands that the USB driver 115 set a flag at "1" in the reservation field, thus requesting that the USB driver 115 should transmit a direct command with execution state. The SD card adapter 12 can determine whether the access command contained in the payload of the USB packet received is a storage command or a direct command with execution state, in accordance with whether the reservation field of the USB packet received is "1" or "0."

FIG. 7 depicts an example of a format for the direct command with execution state.

The direct command with execution state consists of 4 bytes. The operation code is a parameter that represents the type of the operation command contained in the direct command with execution state. There are three types of operation commands. They are as follows:

(1) Data-less command: Operation command that describes no data transfer to and from the SD memory cards 13.

(2) Command with read data: Operation command accompanied by the data reading from SD memory card 13.

(3) Command with write data: Operation command accompanied by the data writing into the SD memory card 13.

As indicated above, the standby flag data (Standby flag) is a parameter (execution state information) that specifies an execution state. The stand-by flag="1" shows that an operation commands (an modification command and an operation command if the operation command is an extended command) of the direct command should be executed in the standby state. In this embodiment, the regular state of SD memory card 13 is a transfer state. Thus, the stand-by flag="1" means that the SD memory card 13 should go into a standby state before the operation command is issued, and the SD memory card 13 should go back to the transfer state after the operation designated by the operation command (an modification command and an operation command if the operation command is an extended command) is completed. The stand-by flag="0" shows that the state of the SD memory card 13 need not be changed before an operation command (an modification command and an operation command if an operation command is an extended command) is issued. In other words, the flag indicates that the operation command be executed in the transfer state, i.e., the regular state.

Extended command flag data (ACMD flag) shows whether the operation command contained in the direct command with execution state is an extended command. The ACMD flag="1" shows that the operation command is an extended command. The command index information (Command Index to the memory card) is an operation command and indicates the number of the operation command concerned. If the ACMD flag="1", an operation command (CMD55) is issued as the modification command showing that the next operation command is an extended command, before the operation command indicating of the command number specified by the command index information is issued.

Argument information (Command Argument to the memory card) shows variables about the operation command and the like. Transfer length information (Data transfer length) shows the data transfer length of the write-in data or read-out data.

An example of the configuration of the host controller 121 will be described, with reference to FIG. 8.

Figure 8:
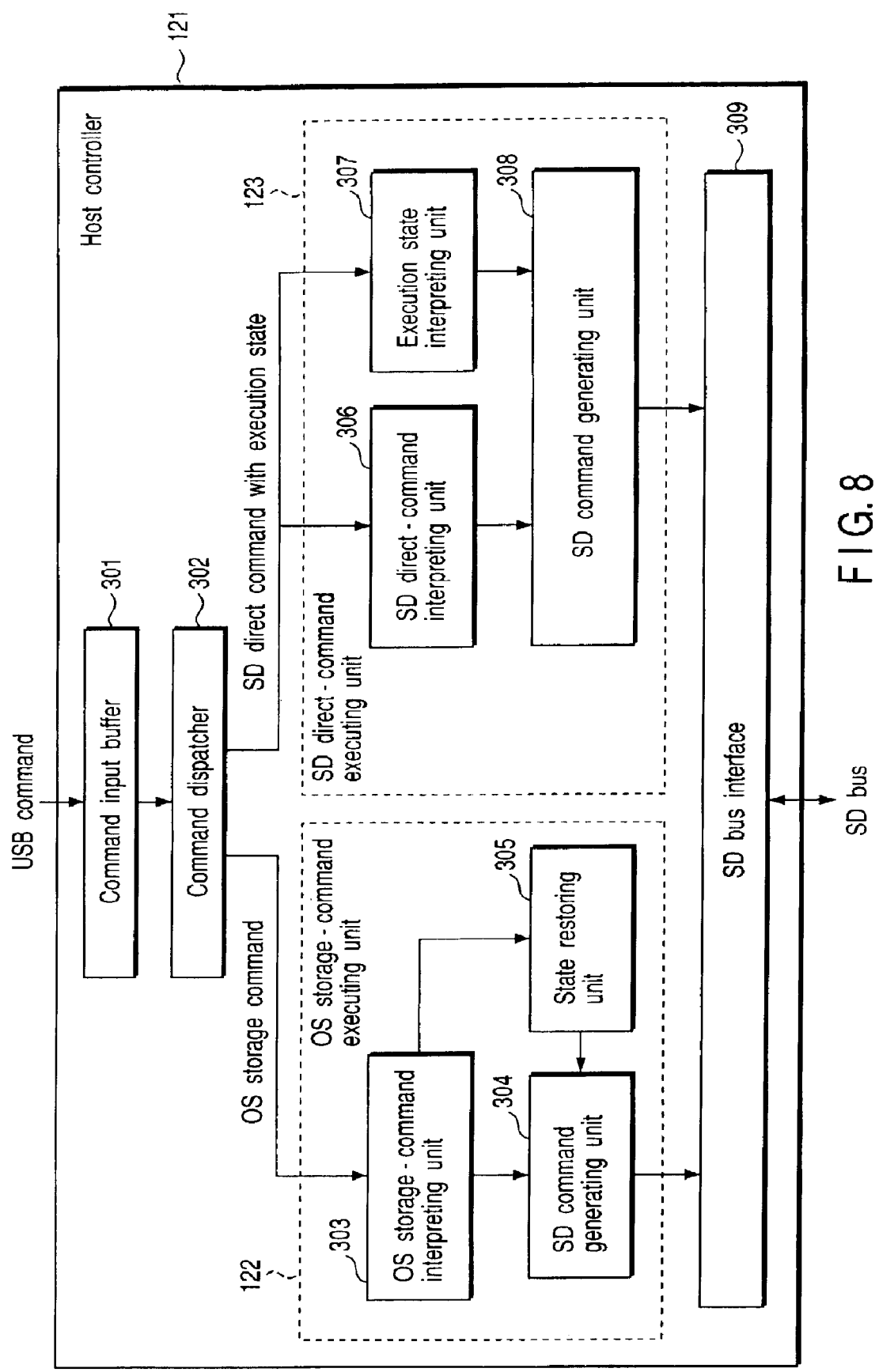
FIG. 8 is a block diagram depicting an example of a host controller for use in the system of FIG. 1.

As FIG. 8 shows, the host controller 121 comprises a command input buffer 301, a command dispatcher 302, and an SD bus interface 309, in addition to the OS storage command-executing unit 122 and the SD direct command-execution unit 123, both described above. The command input buffer 301 and the command dispatcher 302 are the interfaces configured to receive the access commands transmitted from a host system, i.e., a direct command with execution state and a storage command. The command input buffer 301 is a pooling buffer of first-in, first-out type. It receives the access command issued from the OS or the SD application program 112 and temporarily stores the received access command.

The command dispatcher 302 determines which unit, the OS-storage command-executing unit 122 or the SD direct command-execution unit 123, should execute the access command stored in the command input buffer 301, in accordance with the kind of the access command. More specifically, the command dispatcher 302 determines whether the access command issued from the OS or the SD application program 112 is a storage command (OS storage command) or a direct command with execution state. If the access command is an OS storage command, the dispatcher 302 causes the OS storage command-execution unit 122 to process the command. If the access command is a direct command with execution state, the dispatcher 302 makes the SD direct command-execution unit 123 processes the command. The access commands are executed in the order they have been issued.

The OS-storage command-executing unit 122 comprises an OS storage-command interpreting unit 303, an SD command generating unit 304, and a state restoring unit 305. The OS storage-command interpreting unit 303 interprets the OS storage command it has received from the command dispatcher 302, and select one or more operation commands that are required to make the SD memory card 13 perform the operation designated by the OS storage command. The operation commands thus selected are informed to the SD command generating unit 304. An "SD_standby" command that shows the change to a standby state may be included in the operation commands selected. If so, the data representing this face is supplied to the state restoring unit 305. In other words, the OS storage-command interpreting unit 303 determines which operation command can be executed in which state of the SD memory card 13. And the unit 303 determines that an "SD_standby" command should be issued before any operation command that cannot be executed in the transfer state, i.e., the regular state, and needs to be changed to a standby state.

The SD command generating unit 304 supplies one or more operation commands informed from the OS storage-command interpreting unit 303 to the SD memory card 13 through the SD bus interface 309, in order to make the SD memory card 13 perform the operation that corresponds to the demand designated by the OS storage command.

The state restoring unit 305 generates an "SD_transfer" command to set the state of SD memory card 13 back to the regular state (transfer state) after the SD memory card 13 finishes operation that corresponds to the demand designated by the OS storage command.

All operations corresponding to the demand designated by the OS storage command can be performed in the transfer state if the commands issued from the SD memory card 13 include no "SD_standby" commands that show the changes to the standby state. In this case, the SD memory card 13 remains in the transfer state, and the state restoring unit 305 does not generate "SD_transfer" commands.

The SD direct command-execution unit 123 comprises an SD direct-command interpreting unit 306, an execution state interpreting unit 307, and an SD command generating unit 308. The SD direct-command interpreting unit 306 received the direct command with execution state from the command dispatcher 302 and extracts the command index information from the direct command with execution state. The unit 306 supplies the command code number contained in the command index information, as an operation command to be issued, to the SD command issue unit 308 (command passthrough).

The execution state interpreting unit 307 receives the direct command with execution state from the command dispatcher 302 and interprets the standby flag data (Stand-by flag) contained in the direct command with execution state.

If the flag data a Stand-by flag="1," the unit 307 makes the SD command generating unit 308 to issue the "SD_standby" command before the operation command notified from SD direct command-execution unit 123 is issued. After the SD memory card 13 finishes the operation that corresponds to the given from the SD direct command-execution unit 123, the execution state interpreting unit 307 informs that an "SD_transfer" command should be issued.

The SD command generating unit 308 generates an operation command to the SD memory card 13 through the SD bus interface 309 in accordance with the instructions it has received from the SD direct command interpretation unit 306 and the execution state interpretation unit 307.

Figure 9:
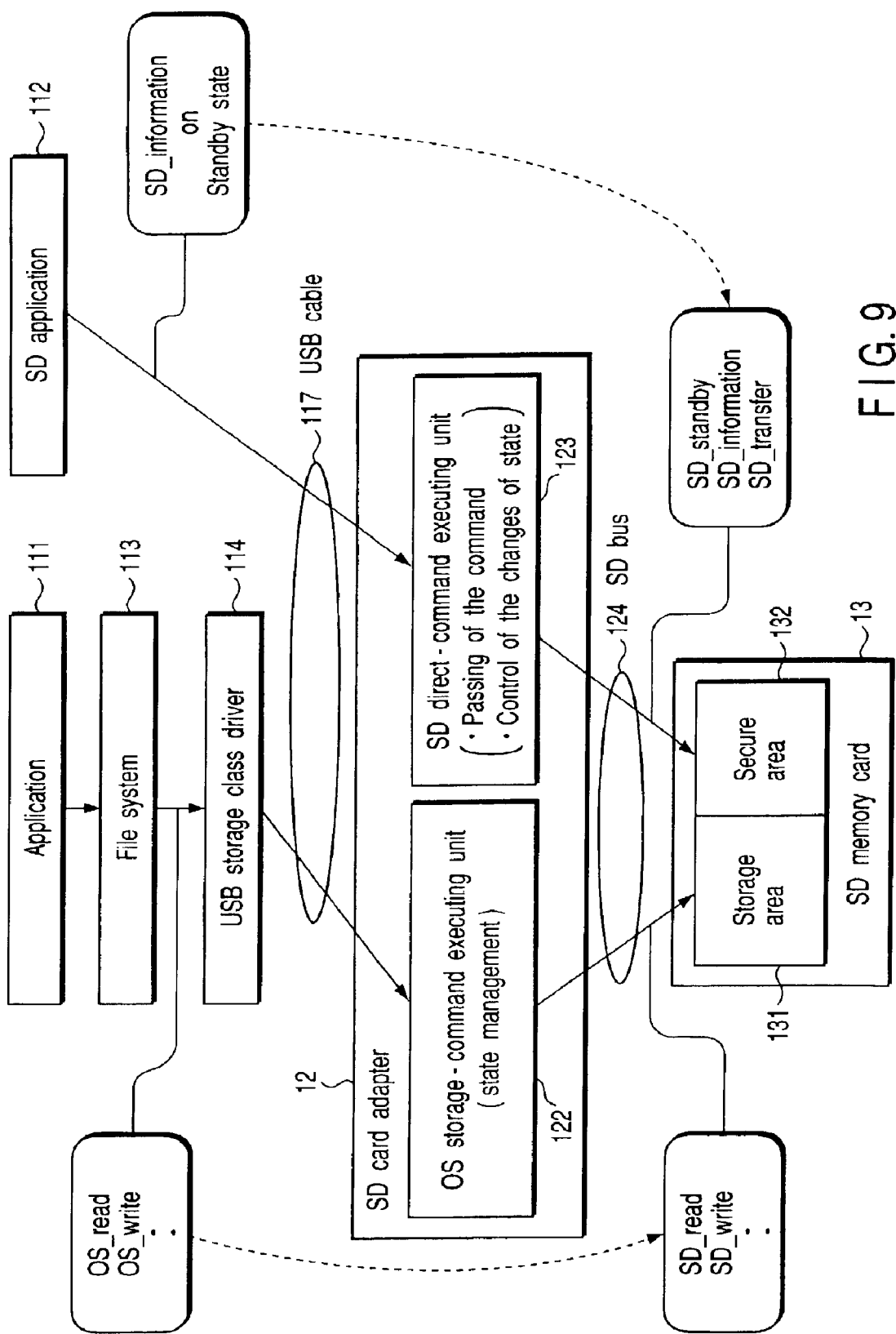
FIG. 9 is a diagram explaining how an OS storage command and a direct command with an execution state command are processed in the system of FIG. 1.

How the SD card adapter 12 processes the OS storage command and the direct command with execution state will be described, with reference to FIG. 9.

Assume that an application program 111 demands that the file system 113 of the OS should read the data stored in the storage area 131. Then, the USB storage-class driver 114 of the OS issues a read demand command "OS_read" as an access command (OS storage command). This OS storage command is sent to the OS-storage command-executing unit 122 of the SD card adapter 12 through the USB driver 115. The OS-storage command-executing unit 122 converts the OS storage command "OS_read" to "SD_read" which is an operation command for SD memory card 13. This operation command "SD_read" is supplied to the SD memory card 13, in which a read access is made to read data from the storage area 131. The data read from the storage area 131 is passed to an application program 111, as a response to the OS storage command "OS_read," through SD card adapter 12, USB storage-class driver 114 and file system 113.

On the other hand, the SD application program 112 may acquire the status information about the secure area 132. In this case, the SD application program 112 generates a direct command with execution state (SD_information on standby state). This direct command shows that "SD_information" command should be executed in the standby state. This direct command with execution state is supplied to the SD direct command-execution unit 123 of SD card adapter 12, without passing through the file system 113 or the USB class driver 114 of the OS. The "SD_standby" command, the "SD_information" command, and the "SD_transfer" command are sent to SD memory card 13 from SD direct command-execution unit 123, in order they are mentioned. The information read from SD memory card 13 by performing operation corresponding to the "SD_information" command is supplied to the SD application program 112, as a response to the direct command with execution state (SD_information on standby state), without passing through the file system 113 of the OS or the like.

Figure 10:
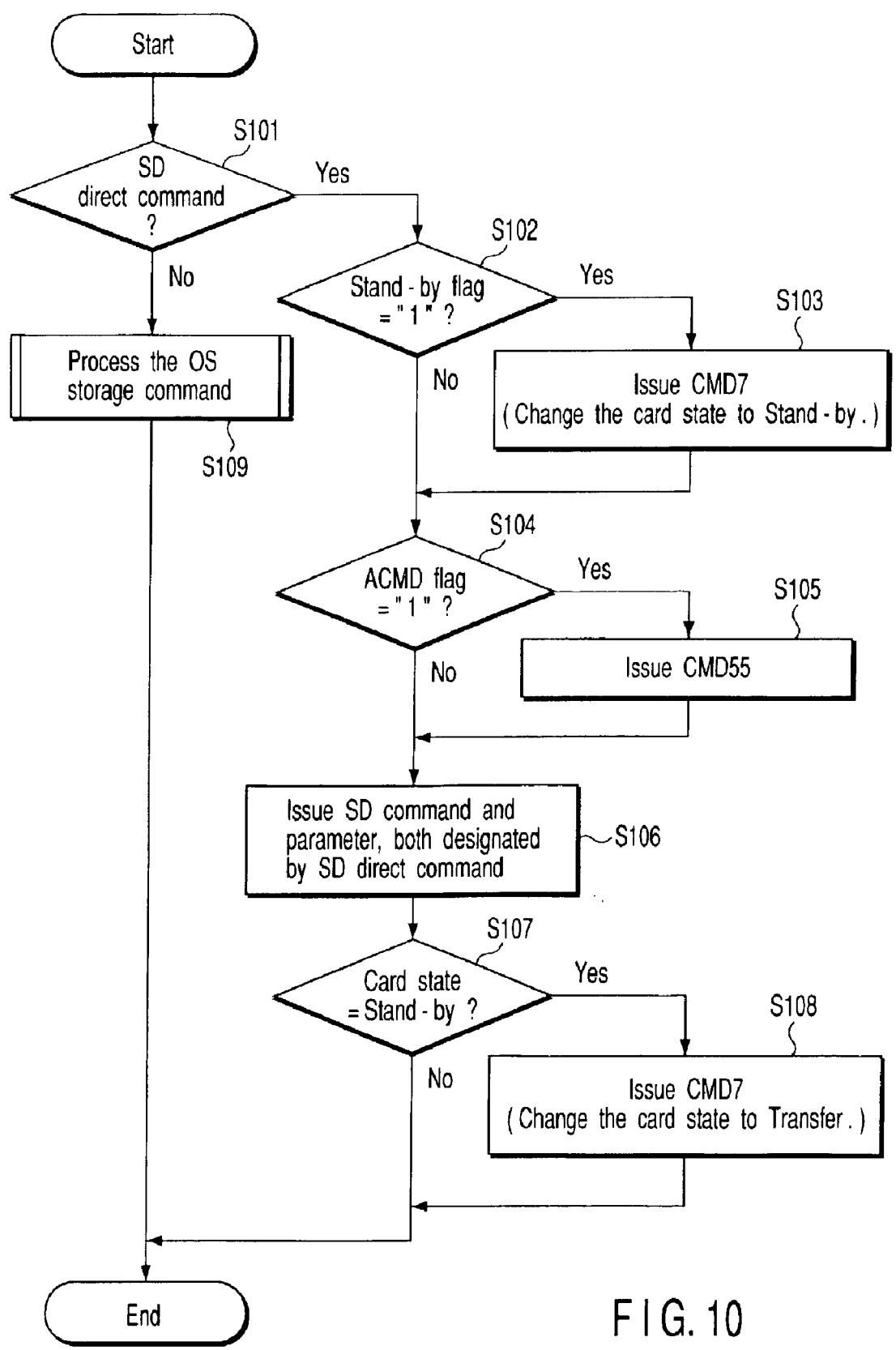
FIG. 10 is a flowchart explaining the sequence of controlling a memory card in the system of FIG. 1.

How the host controller 121 provided in the SD card adapter 12 controls the SD memory card 13 will be explained with reference to the flowchart of FIG. 10.

The host controller 121 extracts the oldest access command from the command input buffer 301 and determines whether this command is an OS storage command or an SD direct command with execution state (Step S101). To this end, it suffices to refer to the bit value of the reservation field of the USB packet, as has been discussed in conjunction with FIG. 6. If the oldest access command is an OS storage command (NO in Step S101), the host controller 121 activates the OS-storage command-executing unit 122. Thus activated, the unit 122 processes the OS storage command (Step S109). How the OS-storage command-executing unit 122 processes the OS storage command will be described later in detail with reference to FIG. 11.

If the oldest access command is an SD direct command with execution state (YES in Step S101), the host controller 121 activates the SD direct command-execution unit 123. The unit 123 processes the SD direct command with execution state. The SD direct command-execution unit 123 first determines whether Stand-by flag="1" (Step S102). If the flag is "1" (YES in Step S102), the unit 123 issues an "SD_standby" command (CMD7) that describes a change to the standby state, to the SD memory card 13. The operating state of the SD memory card 13 is thereby changed from the regular state (transfer state) to the standby state (Step S103). If Stand-by flag="0" (NO in Step S102), the "SD_standby" command (CMD7) will not be issued, and the SD memory card 13 remains in the regular state (transfer state).

Next, the SD direct command-execution unit 123 determines whether ACMD flag="1" (Step S104). If ACMD flag="1" (YES in Step S104), the unit 123 issues a modification command "SDA_CMD" (=CMD55) to the SD memory card 13 (Step S105). This command is an operation command showing that the operation command is generated next is an extended command. If ACMD flag="0" (NO in Step S104), the unit 123 does not generate the command CMD55. The SD direct command-execution unit 123 then generates an operation command having the command number specified for the command index information (Command Index to the memory card). This operation command is issued to the SD memory card 13, making the SD memory card 13 perform the operation that corresponds to the operation command (Step S106). In this case, the variable and the like designated by argument information (Command Argument to the memory card) are generated, if necessary, and are supplied to the SD memory card 13 as parameters of the operation command.

After the process corresponding to the operation command is completed, the SD direct command-execution unit 123 determines whether the SD memory card 13 has been set to the standby state. That is, the unit 123 determines whether CMD7 has been generated in Step S103 due to Stand-by flag="1" (Step S107). If the SD memory card 13 has its operating state changed to the standby state (YES in Step S107), that is, if CMD7 has been issued in Step S103, the SD direct command-execution unit 123 issues CMD7 again to the SD memory card 13 in order to set the SD memory card 13 back to the transfer state, i.e., the regular state (Step S108).

How the SD application program 112 acquires the storage size of the secure area 132 and extracts the card attributes (memory cluster size, etc.) of the SD memory card 13 will be explained. The attributes of SD memory card 13 are not information that is directly related to the secure area 132. Nonetheless, the access command generated from the SD application program 112 is always a direct command with execution state.

<Acquisition of the Storage Size of the Secure Area 132>

The operation command "SDA_SecureSize" for acquiring the storage size of the secure area 132 from the SD memory card 13 is an extended command (ACMD13) that has the command number of 13. This extended command (ACMD13) is a command that can be received and executed in the transfer state. The direct commands with execution state, which the SD application program 112 issues, are as follows.

Operation Code=Command with read data
Stand-by flag=0
ACMD flag=1
Command Index=13

Upon receipt of this direct command with execution state, the host controller 121 performs the following processes:

(1) Check to see that Stand-by flag=0.
(2) Confirm that ACMD flag=1, i.e., an extended command.
(3) Generate CMD55
(4) Generate the contents (13) of Command Index, as CMD13, and acquire the storage size of the secure area 132 from SD memory card 13.
(5) Confirm that the operating state has not been changed the Stand-by state, and terminate the operation.

<Acquisition of Card Attributes (Memory Cluster Size, etc.)>

The operation command for acquiring card attributes (memory cluster size, etc.) from the SD memory card 13 is an operation command (CMD9) of the command number of 9. This operation command (CMD9) is a command that can be received and executed in the standby state. The direct command with execution state, which the SD application program 112 generates, is as follows.

Operation Code=Command with read data
Stand-by flag 1
ACMD flag=0
Command Index=9

Upon receipt of this direct command with execution state, the host controller 121 performs the following processes:

(1) Check to see if Stand-by flag=1.
(2) Generate CMD7 and sets the SD memory card 13 to the stand-by state from the transfer state, i.e., the regular state.
(3) Check that it is not ACMD flag=0, i.e., an extended command.
(4) Generate the contents (9) of Command Index as CMD9, and acquire the card attributes from SD memory card 13.
(5) Confirm that the SD memory card is now in the Stand-by state.
(6) Generate CMD7 again and set the SD memory card 13 back to the transfer state, and terminate the operation.

As mentioned above, the SD memory card 13 is set back to the transfer state every time the process corresponding to the access command received is completed in the present embodiment. Hence, the SD application program 112 needs only to set Stand-by flag at "1," because it is unnecessary to take into account the state the SD memory card 13 assumes at present. In this case, whether Stand-by flag should be set at "1" is uniquely determined by the operation command that should be generated. Since the host controller 121 can determine whether the state should be changed, from the contents of the stand-by flag, it need not take the present state of SD memory card 13 into consideration, either.

The SD application program 112 designates the command number of the operation command that can be issued directly to the SD memory card 13. Therefore, it suffices to upgrade the SD application program 112 even if the command of the SD memory card 13 or the like is extends the security function. Thus, it is not necessary at all to alter the specification of the host controller 121.

Figure 11:
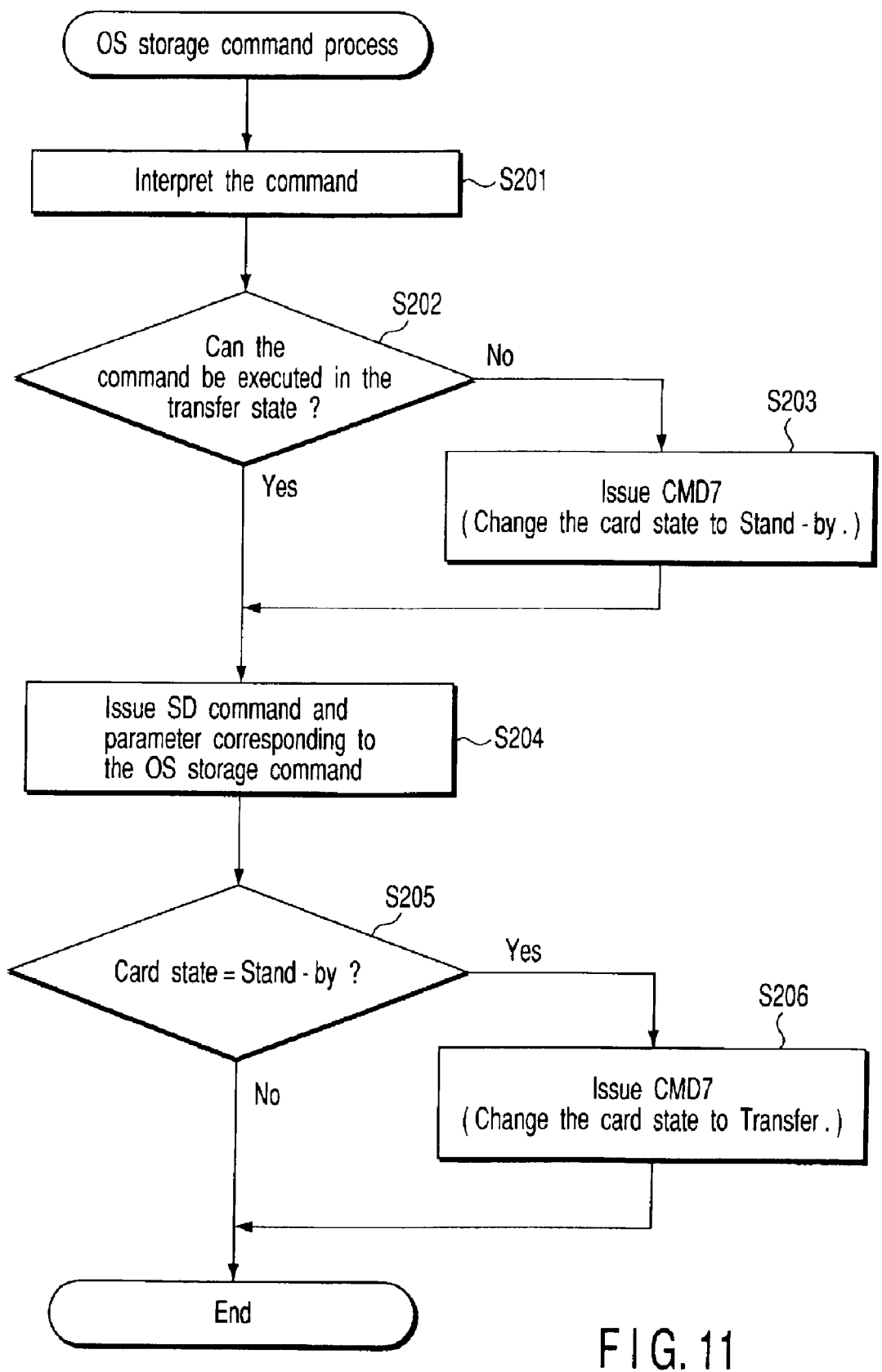
FIG. 11 is a flowchart explaining the sequence of processing an OS storage command in the system of FIG. 1.

How to execute the OS storage command in Step S109 shown in FIG. 10 will be described, with reference to the flowchart of FIG. 11.

The OS-storage command-executing unit 122 first interprets the OS storage command it has received. Then, it determines the operation command that makes the SD memory card 13 perform the process demanded by the OS storage command and also the state in which the SD memory card 13 can receive and execute this operation command (Step S201). If the state in which the SD memory card 13 can receive and execute the determined operation command is the standby state (NO in Step S202), the OS-storage command-executing unit 122 issues the "SD_standby" command (CMD7) indicating the change to the standby state, to the SD memory card 13. The SD memory card 13 is thereby set from the regular state (transfer state) to the standby state (Step S203).

If the state in which the SD memory card 13 can receive and execute the determined operation command is the transfer state (YES in Step S202), the process of changing the state is not carried out. This is because the SD memory card 13 remains in the transfer state, i.e., the regular state, Thereafter, the OS-storage command-executing unit 122 generates the operation command determined in Step S201 on SD memory card 13, and makes SD memory card 13 perform operation corresponding to the OS storage command (Step S204). In this case, the variable and the like are generated, if necessary, by SD memory card 13 as parameters of the operation command concerned. After the process corresponding to the operation command is completed, the OS-storage command-executing unit 122 determines whether the SD memory card 13 has been set to the standby state from the regular state (Step S205). Alternatively stated, the unit 122 determines whether CMD7 has been issued in Step S203. If the SD memory card 13 has been set to the standby state (that is, if CMD7 has been generated in Step S203) (YES in Step S205), the OS-storage command-executing unit 122 issues CMD7 is again, in order to set the SD memory card 13 back to the transfer state, i.e., the regular state (Step S206).

After the OS storage command is executed, the SD memory card 13 is automatically set back to the transfer state. The SD memory card 13 can therefore remain in the transfer state after the OS storage command is executed.

In this embodiment, the transfer state is used as the regular state for the SD memory card 13. This is because the operation command about the accesses to the memory core 204 can be immediately issued to the SD memory card 13, without changing the operating state of the SD memory card 13, as long as the SD memory card 13 stays in the transfer state.

In principle, the standby state can be used as the regular state of SD memory card 13. If this is the case, a transfer flag that describes whether or not the state should be changed to the transfer state is set, in place of the stand-by flag, in the direct command with execution state.

The host controller 121 can be incorporated into the host apparatus 11 that functions as a personal computer, a PDA. If so, the SD memory card 13 can be inserted into and removed from the card slot made in the host apparatus 11.

The host apparatus 11 may be realized in the form of a player that reproduces music data. In this case, the direct command with execution state, described above, may be used to make an access to the SD memory card 13, no matter whether an access to the storage area 131 or an access to the secure area 132. The card control using the direct command with execution state is certainly the most suitable for the memory card device that has a secure area. Nonetheless, this card control can be applied to I/O card devices, too.

All functions of the host controller 121 discussed above are realized by firmware, i.e., a program that is described to control the microcomputer provided in the host controller 121.

Additional advantages and modifications will readily occur to those skilled in the art. Therefore and the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for controlling a card device in accordance with an access command supplied from a host system, the apparatus comprising:

an interface unit configured to receive a command issued by the host system to access the card device, said received command containing an operation command designating an operation to be performed by the card device and execution state information showing a state in which the card device performs the operation designated by the operation command; and a control unit configured to sequentially perform a process of changing the state of the card device from a specific state prescribed as a regular state to a state designated by the execution state information contained in the received command, a process of issuing to the card device the operation command contained in the received command, and a process of setting the card device back to the specific state.

2. An apparatus according to claim 1, wherein the received command further includes an extended command identification information which shows whether the operation command contained in the received command is an extended command which needs to issue a modification command, and said control unit is configured to issue the modification command to the card device before issuing the operation command to the card device, if the extended command identification information contained in the received command shows that the operation command contained in the received command is an extended command.

3. An apparatus according to claim 1, wherein the card device is in any one of a plurality of states including first and second states, the first state being the specific state prescribed as the regular state of the card device, the execution state information contains an execution-state change flag which shows whether the card device needs to be set to the second state, and if the execution-state change flag shows that the card device needs to be set to the second state, said control unit sequentially performs a process of changing the state of the card device, to the second state from the first state which is the specific state, a process of issuing the operation command contained in the received command to the card device to make the card device perform an operation corresponding to the operation command, and a process of setting the card device back to the first state.

4. An apparatus according to claim 3, wherein said control unit performs a process of issuing the operation command contained in the received command to the card device to make the card device perform an operation corresponding to the operation command, if the execution-state change flag shows that the card device need not be set to the second state.

5. An apparatus according to claim 1, wherein the specific state prescribed as the regular state is a state in which the card device can execute an operation command for writing or reading data into or from a nonvolatile memory incorporated in the card device.

6. An apparatus according to claim 1, wherein the card device has a secure area which is a storage area that can be accessed by a program having a function of protecting contents, and the program issues a command containing an operation command and the execution state information, in order to access the secure area.

7. An apparatus according to claim 1, wherein the card device has a user data area which is a storage area that can be accessed by an operating system executed in the host system, and the apparatus further comprises a storage command-executing unit configured to perform sequentially a process of interpreting and executing a storage access command for accessing the user data area and then issuing at least one operation command to the card device, thereby to make the card device perform an operation corresponding to a demand designated by the storage access command, and a process of setting the card device back to the specific state.

8. An apparatus according to claim 7, wherein the interface unit includes a unit configured to determine whether the access command received from the host system is the command containing an operation command and the execution state information or the storage access command, and dispatch the access command to one of said control unit and said storage command-executing unit.

9. A method of controlling a card device in accordance with an access command supplied from a host system, said method comprising:

receiving a command issued by the host system to access the card device, said received command containing an operation command designating an operation to be performed by the card device and execution state information showing a state in which the card device performs the operation designated by the operation command; and sequentially performing a process of changing the state of the card device from a specific state prescribed as a regular state to a state designated by the execution state information contained in the received command, a process of issuing to the card device the operation command contained in the received command, and a process of setting the card device back to the specific state.

10. A method according to claim 9, wherein the received command further includes an extended command identification information which shows whether the operation command contained in the received command is an extended command which needs to issue a modification command, and the performing includes issuing the modification command to the card device before issuing the operation command to the card device, if the extended command identification information contained in the received command shows that the operation command contained in the received command is an extended command.

11. A method according to claim 9, wherein the card device is in any one of a plurality of states including first and second states, the first state being the specific state prescribed as a regular state of the card device, the execution state information contains an execution-state change flag which shows whether the card device needs to be set to the second state, and if the execution-state change flag shows that the card device needs to be set to the second state, the performing sequentially performs a process of changing the state of the card device, to the second state from the first state which is the specific state, a process of issuing the operation command contained in the card device command to the card device to make the card device perform an operation corresponding to the operation command, and a process of setting the card device back to the first state.

12. A method according to claim 11, wherein the performing performs a process of issuing the operation command contained in the card device command to the card device to make the card device perform an operation corresponding to the operation command, if the execution-state change flag shows that the card device need not be set to the second state.

13. A method according to claim 9, wherein the specific state prescribed as the regular state is a state in which the card device can execute an operation command for writing or reading data into or from a nonvolatile memory incorporated in the card device.

14. A method according to claim 9, wherein the card device has a secure area which is a storage area that can be accessed by a program having a function of protecting contents, and the program issues a command containing an operation command and the execution state information, in order to access the secure area.

15. A method according to claim 9, wherein the card device has a user data area which is a storage area that can be accessed by an operating system executed in the host system, and the method further comprises sequentially performing a process of interpreting and executing a storage access command for accessing the user data area and then issuing at least one operation command to the card device, thereby to make the card device perform an operation corresponding to a demand designated by the storage access command, and a process of setting the card device back to the specific state.

* * * * *